Figure 1:
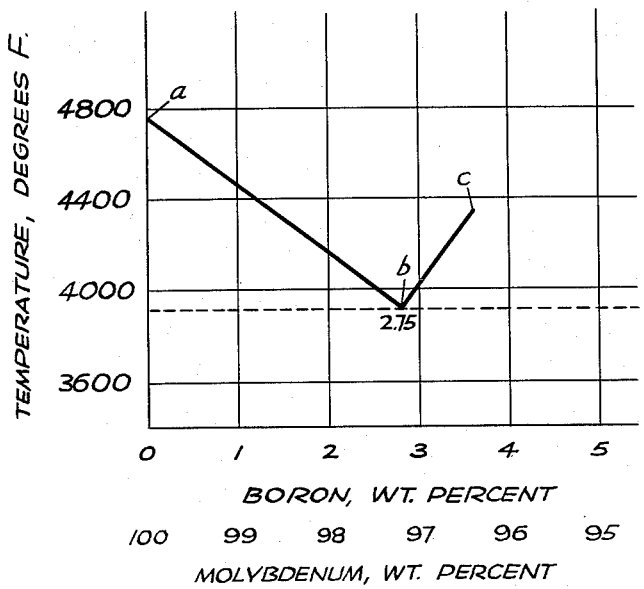

Nov. 29, 1955   L. J. CRONIN   2,725,287
MOLYBDENUM SOLDER POWDER
Filed Nov. 26, 1952

INVENTOR
LEO J. CRONIN
BY Elmer J. Gorn
ATTORNEY

United States Patent Office 2,725,287
Patented Nov. 29, 1955

2,725,287

MOLYBDENUM SOLDER POWDER

Leo J. Cronin, Natick, Mass., assignor to Raytheon Manufacturing Company, Newton, Mass., a corporation of Delaware Application November 26, 1952, Serial No. 322,750

4 Claims. (Cl. 75—.5)

This invention relates to soldering materials, and more specifically to materials of relatively high melting points useful for joining refractory metals.

There are many applications that require the use of refractory metals, such as tantalum, tungsten, molybdenum, and their alloys. These metals are usually joined by soldering or brazing, using a material with a melting point only slightly below that of the metal itself.

These refractory metals are frequently used in the construction of electron-discharge devices, particularly for those parts subjected to elevated temperatures and high mechanical and electrical stresses. Heretofore, it has been customary to join these materials, using platinum as a soldering or brazing material. Platinum, however, has numerous disadvantages, including its high cost, high vapor pressure, adverse effect on electron emission, and a tendency to increase the resistance of other metals and to fatigue.

It has been found, however, that mixtures of certain metals and metalloids, when properly prepared, form very satisfactory soldering or brazing materials whose melting points can be varied through a broad range of temperatures by changing the proportions of the components of the mixture. These materials produce strong uniform bonds without appreciable embrittlement of the metal adjacent to the joints. The vapor pressure of these solders at high temperatures is low, and no poisoning of even the highest vacuums has been detected.

It has also been found that intimate mixtures of the finely-divided components of the solder will melt at substantially the same temperature as an alloy of the same composition. This is probably caused by a sintering or partial fusing at the points of contact between the particles, the resulting liquid gradually dissolving the rest of the material into the melt. Thus, the material can be furnished in the form of a powder which may be applied to the joints either as such, or in the form of a paste or slurry when mixed with any suitable flux or binder. It is one of the objects of this invention to provide a soldering material with superior characteristics for use in joining refractory metals in the manufacture of electron discharge and other devices requiring the use of such metals and alloys.

Another object is to provide a family of soldering materials of slightly varying composition and progressive melting points, so that a solder of any desired melting point within the range hereafter specified can be provided.

Figure 2:
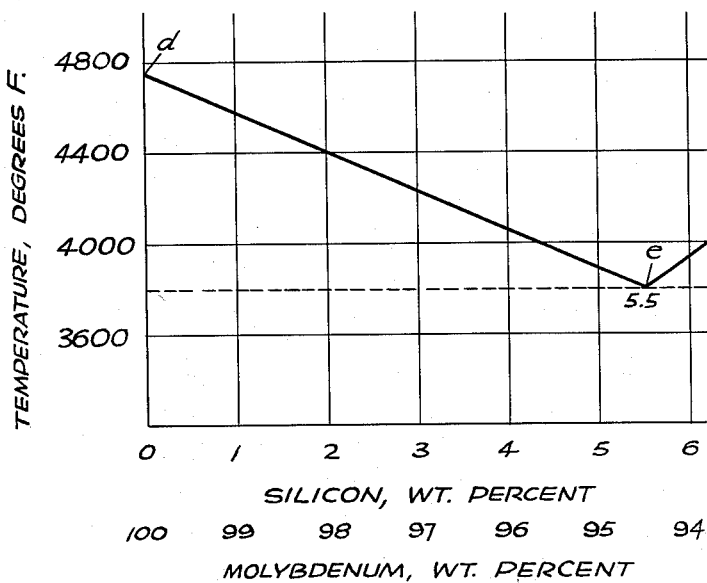

These and other objects of the invention will become clear in connection with the following description of the embodiments of the invention with reference to the attached drawing wherein:

Fig. 1 is a diagram of the melting point of certain mixtures of boron and molybdenum; and Fig. 2 is a similar diagram of the properties of a silicon-molybdenum mixture.

In Fig. 1, the composition of a mixture of finely-divided boron and finely-divided molybdenum is plotted along the horizontal axis, while degrees Fahrenheit are plotted along the vertical axis. The melting points of the various compositions are plotted along the line *a—b—c*.

Mixtures of powdered molybdenum and boron, in proportions ranging from about 99½ per cent. molybdenum and .5 per cent. boron to about 96 per cent. molybdenum and 4 per cent. boron, constitute useful embodiments of this invention. As shown by Fig. 1, the melting point of the mixtures in the indicated range is from about 4700° F. at point *a* to a low of 3950° F. at the eutectic point (represented by point *b*) at 2.75 per cent. of boron. Thus, a satisfactory solder can be made with a melting point anywhere desired within this 750° range.

In Fig. 2, the melting points of a mixture of finely-divided silicon and finely-divided molybdenum are represented in the same manner as described in connection with Fig. 1, the melting points being plotted along line *d—e—f*. Mixtures of powdered molybdenum and silicon, whose compositions range from about 99½ per cent. molybdenum and .5 per cent. silicon to about 93 per cent. molybdenum and 7 per cent. silicon, constitute another useful group of embodiments of this invention. As can be seen from Fig. 2, this solder can be made to melt at any desired temperature between 4700° F. at point *d* and 3800° F. as indicated by point *e*.

These materials are prepared by mixing the finely-divided components in the desired proportions, and blending them by tumbling them in a mechanical mixer for approximately twelve hours. The resulting powder in these is mixed with any suitable binder such as water, alcohol, or a paste-type flux, and applied to the parts to be joined in the form of a paste or slurry.

The parts so coated with soldering mixture are thus set in position and placed in a furnace. When the temperature rises above the melting point of the solder, an excellent joint is rapidly formed.

It is to be understood that this invention is not limited to the particular details as described, as many equivalents will suggest themselves to those skilled in the art. For example, other methods of mixing or applying the compounds may be used, as well as other techniques of soldering, sintering, or brazing in the manufacture of various types of devices. It is, therefore, desired that the appended claims be given a broad interpretation commensurate with the invention.

What is claimed is:

1. A soldering and brazing material consisting of a finely-divided mixture of metallic molybdenum and one of the group of metalloids consisting of silicon and boron, in proportions which are between the limits of about 99½ per cent. of molybdenum and .5 per cent. of the metalloid, and about 93 per cent. of molybdenum and 7 per cent. of the metalloid.

2. A soldering and brazing material consisting of a finely-divided mixture of metallic molybdenum and one of the group of metalloids consisting of silicon and boron, in proportions which are between the limits of about 99½ per cent. of molybdenum and .5 per cent. of the metalloid, and about 93 per cent. of molybdenum and 7 per cent. of the metalloid and mixed with a volatile binder.

3. A soldering and brazing material consisting of a finely-divided mixture of metallic molybdenum and boron, in proportion varying from about .5 per cent. of boron and 99½ per cent. of molybdenum to about 4 per cent. of boron and 96 per cent. of molybdenum.

4. A soldering and brazing material consisting of a finely-divided mixture of metallic molybdenum and silicon, in proportion varying from about .5 per cent. of silicon and 99½ per cent. of molybdenum to about 7 per cent. of silicon and 93 per cent. of molybdenum.

References Cited in the file of this patent

UNITED STATES PATENTS

| | | |
|---|---|---|
| 1,601,931 | Van Arkel | Oct. 5, 1926 |
| 1,774,849 | Schroter | Sept. 2, 1930 |
| 1,807,581 | Bates | June 2, 1931 |
| 2,253,533 | Ruben | Aug. 26, 1941 |
| 2,359,401 | Wulff | Oct. 3, 1944 |
| 2,623,975 | Watrous | Dec. 30, 1952 |
| 2,627,110 | Hickey | Feb. 3, 1953 |

FOREIGN PATENTS

| | | |
|---|---|---|
| 487,263 | Great Britain | June 17, 1938 |